United States Patent [19]

Persson

[11] 4,093,261

[45] June 6, 1978

[54] COASTER BRAKE FOR BICYCLE WITH DERAILLEUR SPEED CHANGE MECHANISM

[76] Inventor: Ray S. Persson, 1220 Minnesota Ave., Bemidji, Minn. 56601

[21] Appl. No.: 795,104

[22] Filed: May 9, 1977

[51] Int. Cl.² ............................................. B62M 9/10
[52] U.S. Cl. .............................. 280/241; 74/242.11 B; 192/5; 280/238
[58] Field of Search ................ 188/24, 2 C; 280/236, 280/238, 241, 261; 74/242.11 B, 217 B; 192/5, 6 R, 6 A, 64

[56] References Cited

U.S. PATENT DOCUMENTS

| | | | |
|---|---|---|---|
| 658,119 | 9/1900 | Parsons | 192/5 |
| 663,845 | 12/1900 | Bailey | 192/5 |
| 765,945 | 7/1904 | Weiler | 192/5 |
| 1,430,771 | 10/1922 | Touchais et al. | 192/5 |
| 2,572,182 | 10/1951 | Mueller | 188/26 |
| 3,386,544 | 6/1968 | Matsuda | 192/6 R |
| 3,448,628 | 6/1969 | Shimano et al. | 74/217 B |

Primary Examiner—Joseph F. Peters, Jr.
Assistant Examiner—Terrance L. Siemens
Attorney, Agent, or Firm—Lee R. Schermerhorn

[57] ABSTRACT

A chain seizing device responds to reverse movement of the driving chain to declutch the wheel hub from the multiple drive sprocket and apply the coaster brake to the wheel hub. Forward rotation of the sprocket moves a clutch member axially in one direction to release the brake and engage the clutch. Reverse rotation of the sprocket shifts the clutch member in the opposite direction to disengage the clutch and apply the brake. The sprocket is reversed by an arm on the chain seizing device acting through a pawl engagable with the sprocket.

8 Claims, 5 Drawing Figures

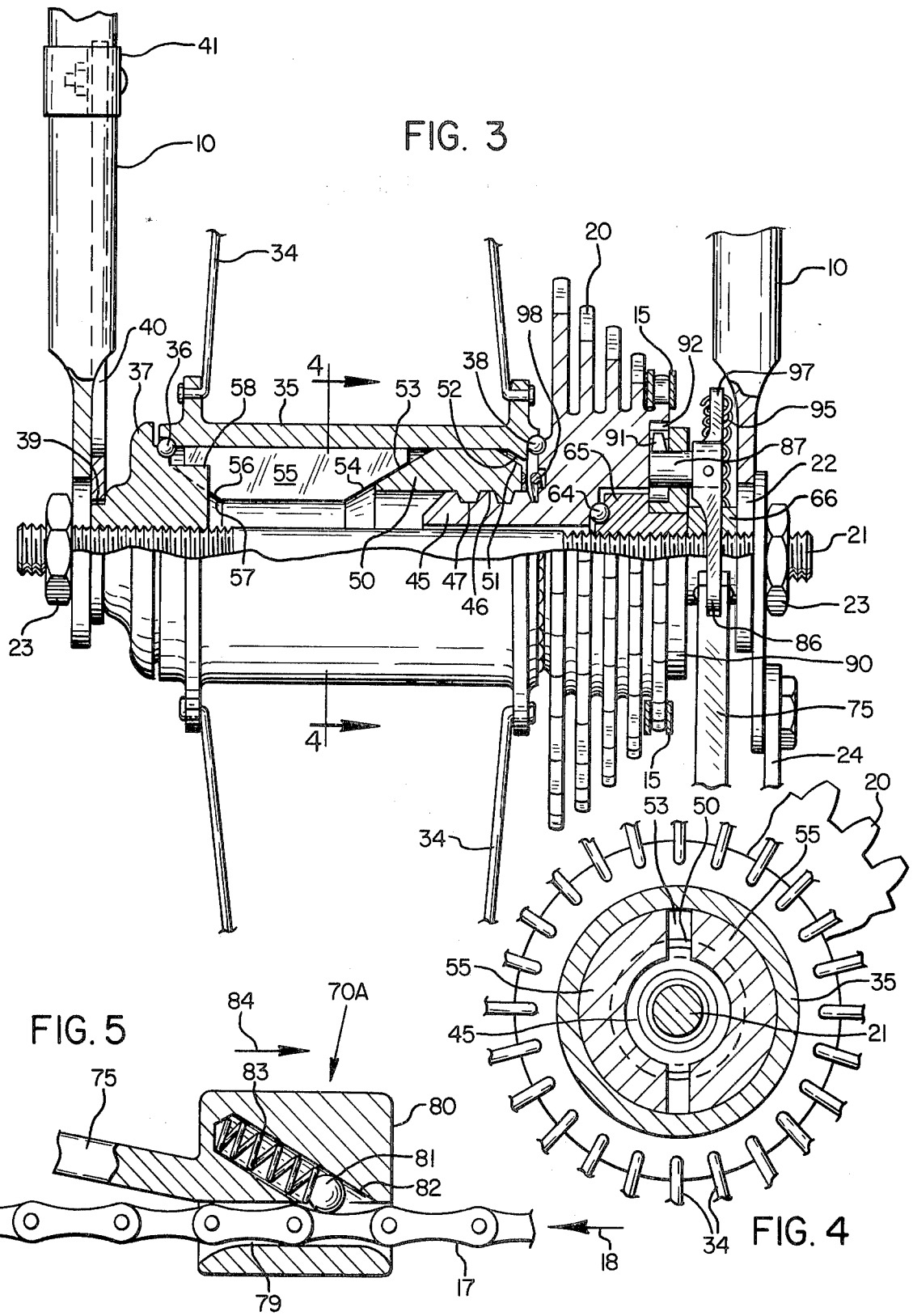

COASTER BRAKE FOR BICYCLE WITH DERAILLEUR SPEED CHANGE MECHANISM

BACKGROUND OF THE INVENTION

This invention relates to a coaster brake for a bicycle equipped with a derailleur speed change mechanism.

In the conventional bicycle equipped with a derailleur speed change mechanism it is commonly known that a reverse direction of the chain, or back pedaling, cannot be utilized to provide braking force. This is because of the nature of the speed change mechanism, having spring tension to take up the slack of the driving chain in shifting to a plurality of gears.

Mechanisms heretofor devised for the present purpose require modification of the foot pedal crank arm assembly and its mounting on the bicycle frame. This has resulted in mechanisms which are objectionably complicated and expensive, and impractical for application to existing conventional bicycles.

Objects of the present invention are therefore to provide a more simple and practical device for operating a coaster brake in a bicycle with a derailleur speed change mechanism, to provide a device of the type described which does not require modification of the foot pedal crank arm assembly and its mounting on the bicycle frame, and to provide a device which responds directly to reverse movement of the driving chain to declutch the wheel hub from the multiple drive sprocket and apply the coaster brake to the wheel hub.

SUMMARY OF THE INVENTION

In the present construction a chain seizing device responds to reverse movement of the driving chain to declutch the wheel hub from the multiple drive sprocket and apply the coaster brake to the wheel hub. Forward rotation of the sprocket moves a clutch member axially in one direction to release the brake and engage the clutch. Reverse rotation of the sprocket shifts the clutch member in the opposite direction to disengage the clutch and apply the brake. The sprocket is reversed by an arm on the chain seizing device acting through a pawl engagable with the sprocket.

Thus the present device does not require any modification of the foot pedal crank arm assembly. The drive chain is free of any interference from the seizing device in the forward motion of the chain. When the direction of the chain is reversed by reverse rotation of the crank arms the chain seizing device grips the chain to transmit braking force to a pawl which rotates the multiple drive sprocket through an angle of reverse rotation. The braking force is exerted by the pull on the lower run of the chain ahead of the multiple drive sprocket without interferring in any way with the derailleur speed change mechanism.

The invention will be better understood and the foregoing and additional objects and advantages will become apparent from the following description of the preferred embodiments illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 3 is a partial sectional view through the rear wheel hub.

FIG. 4 is a view on the line 4—4 in FIG. 3.

FIG. 5 is a side elevation of a modified chain clutch.

DESCRIPTION OF THE PREFERRED EMBODIMENTS

Figure 1:
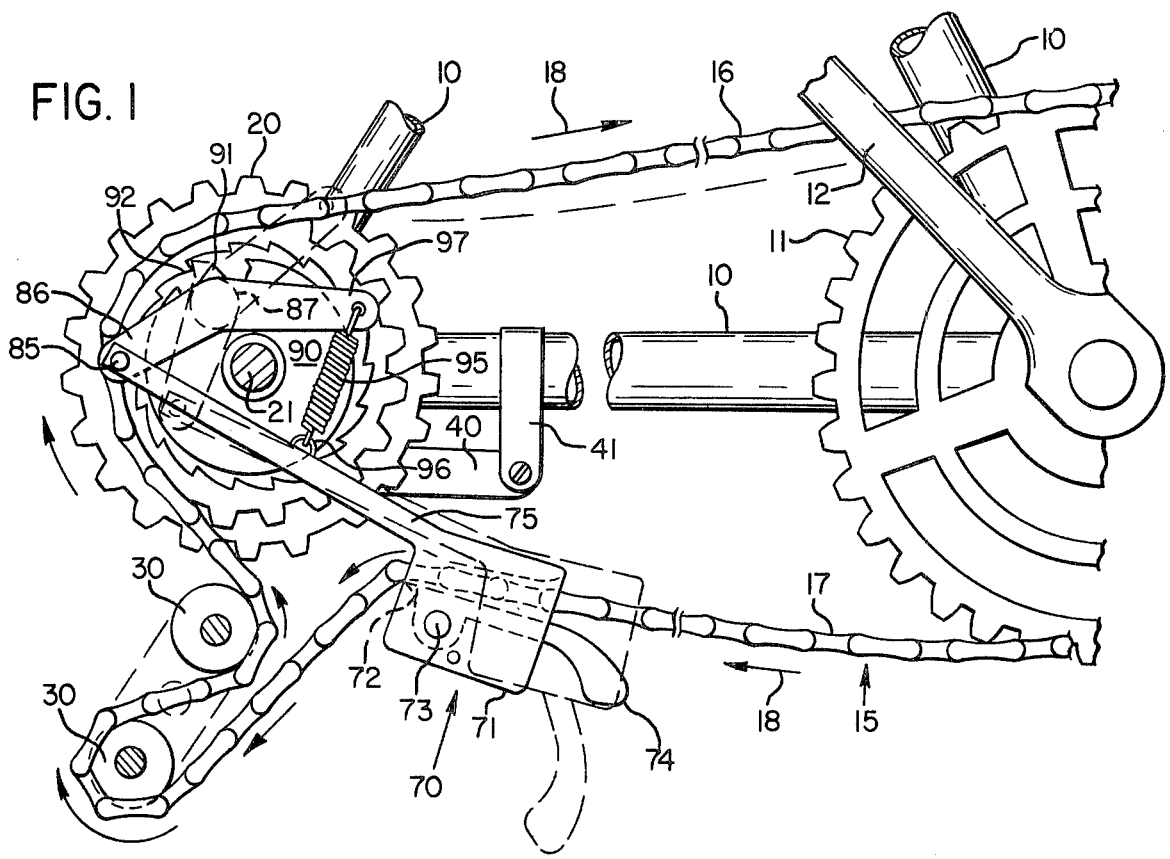
FIG. 1 is a fragmentary side elevation view of a bicycle, with parts broken away, embodying the invention, showing the parts in the positions assumed in normal forward travel by operation of the foot pedals.
Figure 2:
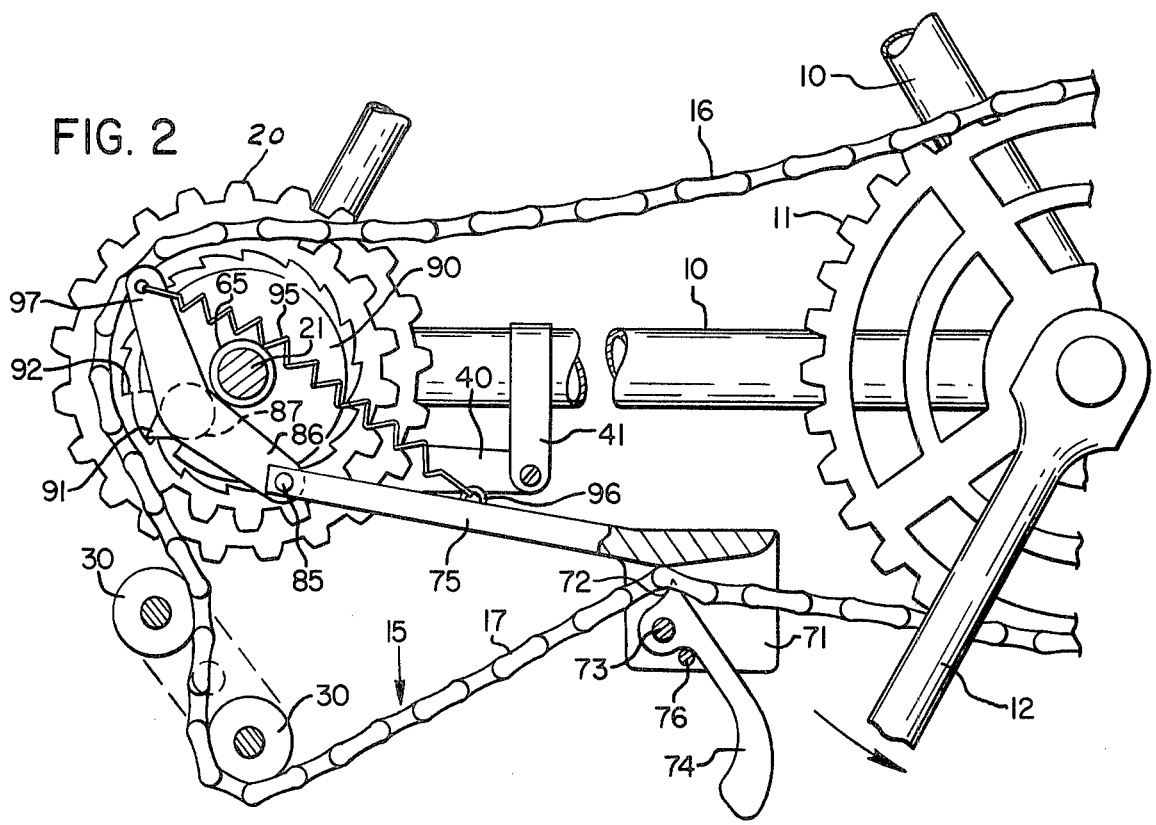
FIG. 2 is a similar view showing the positions of the parts upon reverse rotation of the pedals to apply the coaster brake.

In FIGS. 1 and 2 the bicycle frame 10 is equipped with a conventional drive sprocket 11 and pedal crank arm assembly 12 mounted in the conventional way without any modification. Sprocket 11 drives a chain 15 having an upper run 16 which is tensioned in forward travel, and a lower run 17 which is slack in forward travel, as shown in FIG. 1, the direction of chain travel being indicated by arrows 18.

In forward travel, chain 15 drives multiple sprocket 20 in the derailluer speed change mechanism. Sprocket 20 rotates about a fixed axel 21 which is mounted in adjustment slots 22 in frame 10 by means of nuts 23 as shown in FIG. 3. Arm 24 supports rollers 30 of the derailleur speed change mechanism in FIG. 1, the details of this mechanism being well understood in the art and not requiring specific illustration or description.

The rear wheel of the bicycle is represented by spokes 34 and cylindrical hub 35 in FIG. 3. One end of hub 55 is rotatably supported on ball bearings 36 which ride in an annular groove in a fixed bearing cone 37 and the other end of the hub is supported by ball bearings 38 which ride in an annular groove in multiple drive sprocket 20. Bearing cone 37 has threaded engagement with axel 21 and has a square outer end at 39 which is received in a square hole in a conventional brake torque arm 40 to prevent rotation of cone 37. A forward end of arm 40 is connected to frame 10 by the usual clamp 41.

Multiple drive sprocket 20 has an axial hub extension 45 provided with an external helical thread 46 which meshes with the internal helical thread 47 in an annular drive clutch member 50. One end of clutch member 50 has a conical clutch surface 51 adapted to engage a mating conical clutch surface 52 in the end of hub 35.

The other end of clutch member 50 has a conical surface 53 to engage a mating conical surface 54 on the inner ends of a pair of arcuate brake shoes 55. The outer end of each brake shoe has a conical surface 56 resting on a conical surface 57 on the inner side of bearing cone 37. A pair of lugs 58 on the bearing cone project between the brake shoes 55 to prevent rotation of the brake shoes.

In FIG. 3, reverse rotation of multiple drive sprocket 20 through an angle of movement has moved clutch member 50 to the left, separating the clutch surfaces 51 and 52 and allowing the wheel to rotate independently of sprocket 20. The forceful reverse rotation of sprocket 20 causes conical surface 53 to expand the brake shoes 55 against the inside surface of hub 35 and apply braking action to the wheel. When forward rotation of sprocket 20 is resumed, the helical thread 46 shifts clutch member 50 to the right, releasing brake shoes 55 and engaging clutch surface 51 with clutch surface 52 to rotate the wheel forward.

Sprocket 20 is mounted for rotation on ball bearings 64 which ride in an annular groove in a bearing ring 65 having threaded engagement on axel 21. A nut 66 serves as a lock nut to maintain the adjusted position of bearing ring 65 and also serves as a spacer between the bearing ring and frame 10.

FIGS. 1 and 2 show the novel means for reversing sprocket 20 to declutch the bicycle wheel and apply the coaster brake. A means for seizing the lower run 17 of chain 15 comprises a one way or over running chain clutch 70. In forward travel, as shown in FIG. 1, the chain passes through a housing 71 in the direction of arrows 18, sliding freely past a pawl detent 72 mounted on a pivot 73. Pawl 72 is on the short end of an arm having longer end 74 which tends to drop by gravity to hold pawl 72 up against the under side of the chain.

When the direction of chain travel is reversed, as shown in FIG. 2, the chain hooks on pawl 72 and pulls a brake arm 75 to the right. A stop pin 76 limits the clockwise rotation of pawl 72.

A modified form of chain clutch is shown at 70A in FIG. 5. In this device the lower run 17 of the chain slides freely through a passage way 79 in a housing 80 when the chain is moving to the left during forward travel of the bicycle as indicated by arrow 18.

When the chain is pulled to the right by reverse rotation of pedal crank arm 12 the openings in the links of the chain wedge a ball detent 81 against an inclined guide surface 82 locking housing 80 to the chain and pulling brake arm 75 to the right, as indicated by arrow 84, the same as shown in FIG. 2. A compression spring 83 holds ball 81 in contact with the chain and at the same time allows the ball to be pushed back without locking the chain when the chain moves to the left.

Referring back to FIGS. 1 and 2, the rear end of brake arm 75 is pivotly connected at 85 to one end of a lever arm 86 which is pivotly mounted at 87 in a disc 90. Disc 90 is mounted for rotation on bearing ring 65 as shown in FIG. 3. Lever arm 86 rotates an integral pawl 91 into engagement with internal teeth 92 in a recess in sprocket 20 to impart the previously mentioned reverse rotation to the sprocket when pedal crank arms 12 are reversly rotated as shown in FIG. 2.

In forward travel, chain clutch 70 or 70A releases the chain and allows tension spring 95 to retract pawl 91 away from engagement with teeth 92 as shown in solid lines in FIG. 1. One end of spring 95 is anchored at 96 to arm 75 and the opposite end of the spring is connected to the opposite end 97 of lever arm 86.

Thus the reversal of chain movement as shown in FIG. 2 is effective to disengage and separate clutch surfaces 51 and 52 and actuate the brake shoes 55, as shown in FIG. 3, without disturbing the slack accumulating means or otherwise interferring in any way with the derailleur speed change mechanism. When forward pedal rotation is resumed, pawl 91 is disengaged from sprocket 20 and clutch member 50 releases brake shoes 55 and engages mating clutch surfaces 51 and 52.

However, in practice it is sometimes found that if the pedals are not reversed in a slighest degree so as to separate the clutch surfaces 51 and 52, when the bike is pushed backwards with such surfaces yet binding, the hub sprocket moving in reverse rotation sets the chain and chain clutch 70 or 70A into seizing action and binds the chain, subsequently hindering reverse rotation of wheel 34, 35.

Such adverse action does not occur if the pedals are backed off slightly to separate clutching surfaces 51 and 52 and it may not occur in any event if the parts are manufactured with high precision. Generally, this adverse action does not occur.

As a precaution, however, it may be desirable to insert a flat ring compression thrust spring 98 between the inner face of sprocket 20 and the outer end of clutch member 50 as shown in FIG. 3. This will tend to initiate separation of clutch surfaces 51 and 52 as soon as forward pedaling ceases. Spring 98 may be omitted in any particular assembly where it is not found to be necessary.

What is claimed is:

1. In a bicycle having a coaster brake and a derailleur speed change mechanism, a driving chain having a tensioned upper run to rotate a multiple drive sprocket in forward rotation, a wheel having a wheel hub, a drive clutch engagable with said hub to drive said hub in forward rotation from said sprocket, an overrunning chain clutch on a lower run of said chain allowing free movement of said chain in said forward rotation and arranged to seize said chain in reverse rotation when the lower run of the chain is tensioned, means operable by the movement of said chain clutch with the chain when the chain is seized to rotate said sprocket forcefully in a partial reverse rotation, and means actuated by said reverse rotation of said sprocket to disengage said drive clutch and apply said coaster brake.

2. A bicycle as defined in claim 1, said means for rotating said sprocket in reverse rotation comprising an arm connected at one end with said chain clutch, a member rotatable concentric with with said sprocket, and a pawl pivotally mounted on said member to engage teeth on said sprocket, the other end of said arm being connected with a lever arm on said pawl.

3. A bicycle as defined in claim 2 including a recess in said sprocket containing said teeth, said pawl being rotatable in said recess.

4. A bicycle as defined in claim 2 including spring means to disengage said pawl from said teeth and reverse said movement of said chain clutch when forward rotation of said sprocket and chain are resumed after application of said brake.

5. A bicycle as defined in claim 1, said chain clutch comprising a housing having a passageway therethrough for said chain, and a detent allowing free movement of said chain through said housing in said forward rotation and locking said housing to said chain during said reverse rotation.

6. A bicycle as defined in claim 1, said means to disengage said drive clutch and apply said coaster brake comprising a screw threaded hub on said sprocket.

7. A bicycle as defined in claim 1, said drive clutch having a conical clutch surface on one end engagable with a conical surface on said hub and a conical surface on an opposite end to apply said coaster brake, and a screw threaded hub on said sprocket arranged to move said drive clutch axially in one direction to release said brake and engage said clutch in said forward rotation and to move said drive clutch in the opposite direction to disengage said clutch and apply said brake in said reverse rotation.

8. A bicycle as defined in claim 1 including a compression thrust spring interposed between said sprocket and said drive clutch to tend to initiate said disengagement of said drive clutch upon cessation of forward rotation of said sprocket.

* * * * *